United States Patent
Kirkpatrick

[15] 3,688,583
[45] Sept. 5, 1972

[54] ADJUSTABLE FREE-PERIOD SEISMOMETER

[72] Inventor: Burnard M. Kirkpatrick, Dallas, Tex.

[73] Assignee: Teledyne Industries, Inc., Geotech Division,

[22] Filed: Nov. 23, 1970

[21] Appl. No.: 91,660

[52] U.S. Cl.................................................73/382
[51] Int. Cl..............................................G01v 7/12
[58] Field of Search .....................73/382; 267/160

[56] References Cited

UNITED STATES PATENTS

| 2,293,437 | 8/1942 | LaCoste et al.............73/382 |
| 3,194,060 | 7/1965 | Greenwood.............73/382 X |
| 2,523,075 | 9/1950 | Sweet.........................73/382 |
| 3,054,294 | 9/1962 | Kisher et al.............73/382 X |

Primary Examiner—James J. Gill
Attorney—Alexander & Dowell

[57] ABSTRACT

This disclosure includes a seismometer of the LaCoste long-period suspension type in which the free-period of the seismometer is made adjustable over a wide range of values by substituting a pivot having an adjustable torque characteristic for one of the seismometer's pivots and using this adjustable torque to determine the restoring force of the over-all seismometer suspension; and further includes a triflexure structure for said adjustable torque pivot which has a compensated linear adjustment characteristic suitable for control by digital equipment, for instance in automated systems.

14 Claims, 12 Drawing Figures

PATENTED SEP 5 1972 3,688,583
SHEET 1 OF 3
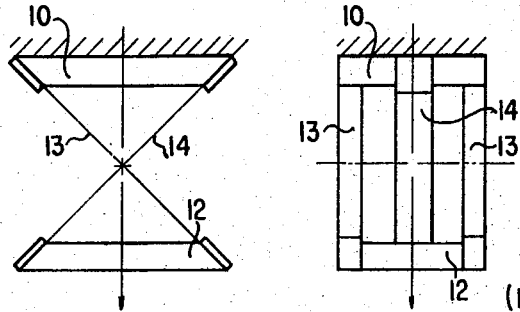
FIG.1 (PRIOR ART)
FIG.2 (PRIOR ART)
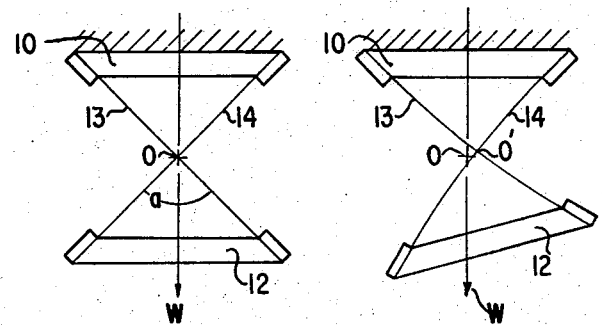
FIG.3 (PRIOR ART)
FIG.4 (PRIOR ART)
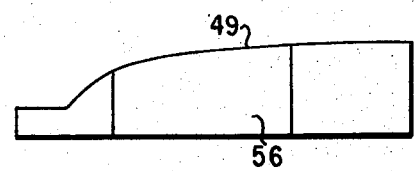
FIG.10
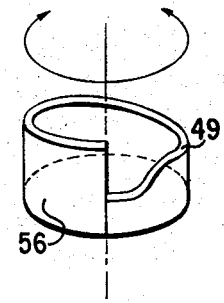
FIG.11
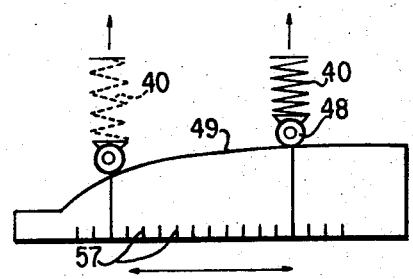
FIG.12
INVENTOR
BURNARD M. KIRKPATRICK
BY Alexander & Dowell
ATTORNEYS

INVENTOR
BURNARD M. KIRKPATRICK

BY Alexander F. Dowell
ATTORNEYS

PATENTED SEP 5 1972  3,688,583
SHEET 3 OF 3
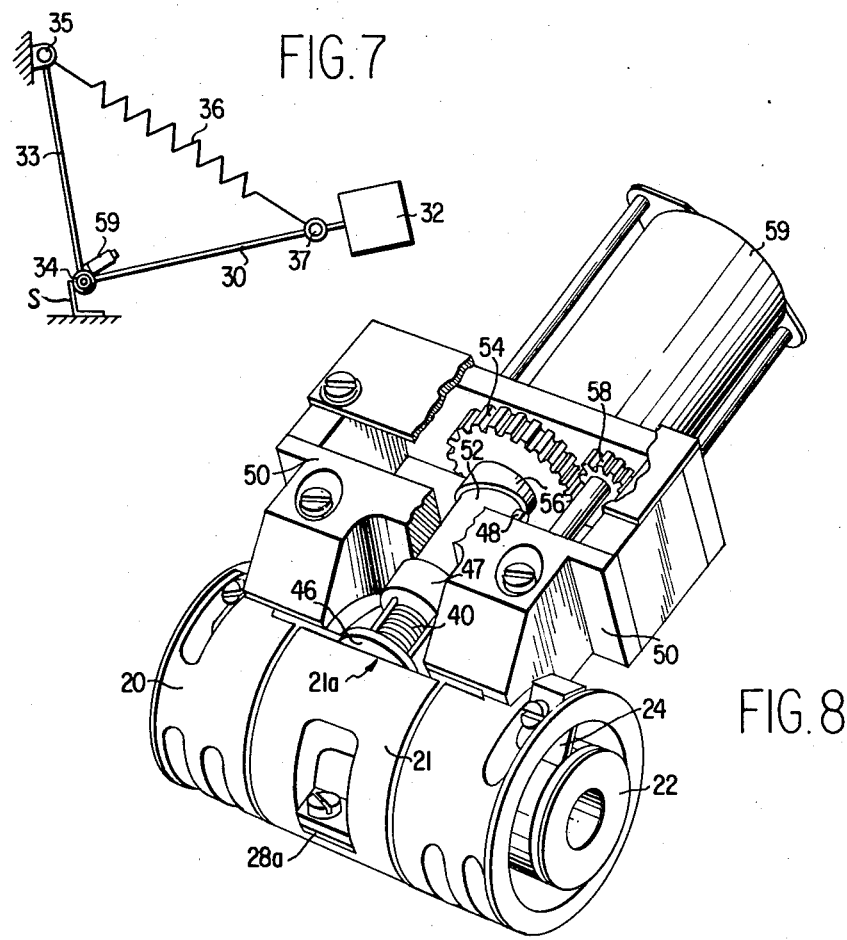
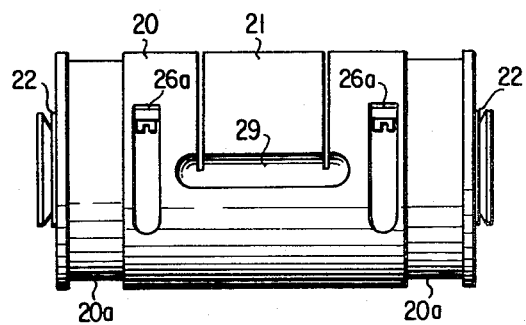
INVENTOR
BURNARD M. KIRKPATRICK
BY Alexander & Dowell
ATTORNEYS

ADJUSTABLE FREE-PERIOD SEISMOMETER

This invention relates to improvements in seismometers, and particularly relates to improvements in adjustable free period seismometers including a mass supported by an improved suspension whose free-period is very long or infinite, meaning that the mass when so suspended will have little or no tendency to center when displaced within permissable limits from its centered position, and will not oscillate about the centered position. It is to an improved technique for adjusting a seismometer's free period, and to a novel adjustable-restoring force pivot that the present invention is directed.

Long-period seismometers are conventionally used to detect earth motions having periods ranging from 10 through about 25 or more seconds. Since the response of a seismometer is that of simple harmonic oscillation, the natural period of its oscillation or free period is determined by the magnitude of its suspended mass and the restoring force of associated spring means within the suspension. A seismometer of this type exhibits mechanical resonance which determines the range of its maximum sensitivity. For various diverse applications, it is desirable to be able to adjust the natural frequency of resonance of a particular seismometer, and it is also desirable to be able to adjust the frequency of one seismometer system to match that of another within close tolerances. This invention describes a novel technique of making such an adjustment that lends itself to predictable results which are easily obtained by remote control of a type which is compatible with computer control.

One of the basic types of seismometer is a type originally proposed by Lucien B. LaCoste and described in U.S. Pat. No. 2,293,437 entitled "Force Measuring Device." This type of seismometer is a torque-balance system wherein the force of gravity acting upon a suspended mass is counter-balanced by a spring force which virtually cancels the force of gravity for all allowed mass positions. If the force of gravity is exactly counter-balanced, this general type of suspension provides a geometry having an infinite period wherein the restoring force urging the mass toward its centered position is zero. Thus, the mass will remain in any position in which it is placed within its allowed range of travel. As normally used, a very long but finite period is selected for a practical seismometer by altering the adjustment of the suspension to obtain a small positive restoring force. The mass is suspended on flexible members which are usually called hinges and which support the mass on the frame of the seismometer. These hinges have taken several different forms according to the prior art, the more recent instruments using flexible wires or leaves. The crossed-flexure pivot has become popular because a crossed pivot can be loaded in such a way as to obtain either a positive or negative restoring force, or else zero restoring force merely by changing the weight of the mass applied to the pivot, although the adjustment of weight is an awkward way to change the restoring force. Another modification of the crossed-flexure pivot is the triflexure pivot which uses in effect three leaves positioned about the pivots moving armature at about 120° intervals and having their outer ends secured in a frame which surrounds the armature. It is to this latter type of pivot structure that the present invention relates.

It is a principal object of the present invention to provide an improved seismometer including means for adjusting the free period over a wide range of values by changing the restoring forces furnished by one triflexure pivot included in the system in such a manner that system parameters such as, for example, arm lengths, reaction mass, generator constant, system balance position, etc, remain substantially constant. According to the present invention, a seismometer suspension, such as a LaCoste suspension having an infinite period, is altered by replacing the mass-supporting pivot with a special triflexure pivot which is modified to exhibit adjustable torque characteristics. The triflexure pivot has leaf type ligaments occupying three mutually crossing planes. The triflexure ligaments in one plane are replaced by a special ligament which is mounted at one end on the housing of the pivot. The portion of the housing which supports the special leaf includes an adjustable structure for selectively loading the special ligament such that the restoring force provided by it is adjustable all the way from the furnishing of a relatively strong positive restoring force to the seismometer mass supporting arm, through a zero restoring force to a negative restoring force. The full range of adjustments is accomplished without affecting most of the other parameters of the seismometer system, while at the same time providing predictable results from changes in the pivot adjustment of known magnitude. The triflexure pivot of the present invention comprises essentially a crossed-flexure pivot to which an adjustable third ligament has been added for the purpose of changing the effective loading on the cross-flexure pivot without changing the seismometer positioning and mass. Thus, the net loading on the cross-flexure pivot is the sum of the supported seismometer load plus the load added by the adjustable effect of the third ligament which comprises the aforesaid special triflexure leaf. The present invention includes novelty in the structure of the leaf itself and in the adjustable manner in which it is mounted in the pivot's housing.

It is another principal object of this invention to apply such a third ligament to a cross-flexure pivot in order to provide an improved torque vs. deflection characteristic of the resulting pivot.

It is a further important object of the invention to provide novel means for supporting the third ligament on a specially designed portion of the housing of the pivot and for positioning that portion carrying the third ligament with respect to the stationary portion of the housing carrying the other two ligaments in such a manner as to control the restoring torque characteristic of the pivot as an independent variable such that, when the pivot is installed in a seismometer, adjustment of that one member is all that is necessary to fully control the period of the seismometer within the range for which the suspension is designed. The prior art teaches ways of adjusting free periods of suspensions of the LaCoste type which involve complex and interrelated series of multiple adjustments in order to produce equivalent results to those attained by the present invention simply by changing a single adjustment of the torque pivot inserted in the seismometer.

Still another important object is to provide means for structurally compensating the adjustable special ligament, or third suspension leaf, so that the only changes which its adjustment makes in the seismometer suspension are the desirable changes in period of the system, the purpose of this compensation being to prevent the undesirable alteration of other system parameters incident to deflection of the pivot and/or adjustment of the free period of the system.

Still another major object of the invention is to provide an improved adjustable seismometer including means for adjusting its oscillatory period in a linear manner such that a particular change in the adjustment of known magnitude produces a predictable linear adjustment in the period of the seismometer. Ordinarily, the change in restoration force produced by the adjustment of a spring in this type of system is a square-law relationship. The present technique improves the art by providing a linearized relationship structure.

It is another important object of the present invention to provide a technique for adjusting the period of a seismometer using a motor to drive the adjustment, and at the same time providing said linearized relationship so that a digital motor can be used in which each step of the motor results in the same amount of change in the period of the seismometer, such a system being especially adaptable to automatic control by a computer to which it can be connected.

Other objects and advantages of the invention will become apparent during the following discussion of the drawings, wherein:

FIG. 1 is a diagrammatic elevation view showing the geometry of an undeflected crossed-flexure pivot looking along the plane of the supporting leaves;

FIG. 2 is an elevation view of the same cross-flexure pivot as viewed from a position normal to the viewing position of FIG. 1;

FIG. 3 is a view similar to FIG. 1 but showing the crossed-flexure pivot loaded by the application of a weight W acting through the crossing O of the planes of the supporting leaves when the pivot is undeflected;

FIG. 4 is a view of the pivot of FIG. 3 when deflected from centered position with the same loading W and showing the instantaneous crossing of the leaves shifted to a point O';

FIG. 7 is a schematic diagram of a LaCoste type seismometer into which an adjustable torque pivot according to the invention has been substituted;

FIG. 8 is a perspective view of a practical torque pivot structure embodying the triflexure suspensions of the type shown in FIGS. 5 and 6;

FIG. 9 is an elevation view of a portion of the pivot shown in FIG. 8;

FIG. 10 is a developed view of a ramp shaped cam employed in the embodiment of FIG. 8;

FIG. 11 is a perspective view of the ramp of FIG. 10 rolled to form a cylindrical cam; and FIG. 12 is a diagram showing the action of the cam and ramp upon the torque pivots adjustable spring system included in the practical illustration of FIG. 8.

Figure 5:
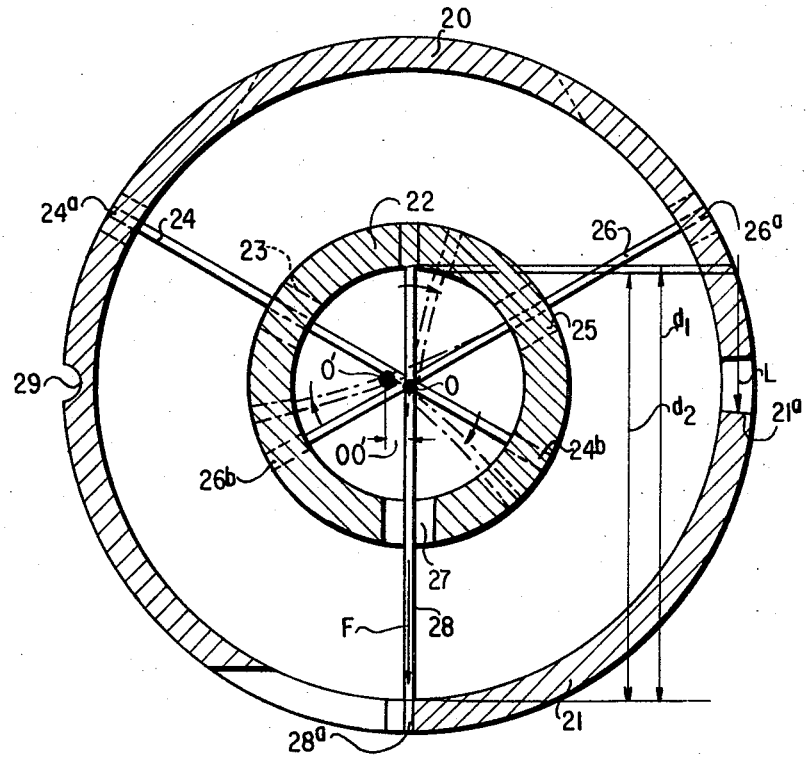
FIG. 5 is a cross-sectional view taken through a triflexure pivot of the general type employed in the present invention.

Referring now to FIGS. 1, 2, 3 and 4, this type of crossed-flexure pivot is illustrated in order to provide a background for the improvement of the present invention. It comprises a stationary member 10 and a moveable member 12, which in the present illustration is capable of being deflected. The suspension of the member 12 from the fixed member 10 is accomplished by crossed-flexure ligaments or leaves, such as the leaves 13 and 14, which according to FIG. 2 are symetrically arranged such that there are two narrower leaves 13 which are the equivalent of the one wider leaf 14. As viewed in FIGS. 1, 3 and 4, these leaves cross each other at an intersection of their planes which as viewed in the undeflected position shown in FIG. 3 comprises a point O. The moveable member of the pivot is loaded by a mass which is represented in FIGS. 3 and 4 by the arrow W. In the non-deflected position of the suspension this arrow lies on a line passing through the point O, and the undeflected arrow bisects the angle $a$ of ligament intersection. It is well known in the art that when the load W is small the resistance to deflection about the axis of rotation O approaches its maximum value in which the restoring force of the pivot is essentially equal to the sum of the restoring forces of the individual ligaments 13 and 14 considered as cantilevered leaves. However, if the load is increased the resistance of the pivot to deflection actually beings to decrease, and if the load W is sufficiently increased the resistance of the pivot to deflection will become equal to zero, whereupon no restoring force occurs as a result of the spring-action of the leaves. The pivot is then in indifferent equilibrium in the sense that it will remain in any position in which it is placed within the design limits of the structure. Finally, if the load W is still further increased, the restoring forces become negative with the result that any deflection of the load from its centered position as shown in FIG. 3 will result in the creation of further decentering forces by the supporting leaves themselves. This behavior is explained by noting that when the moveable member 12 is deflected to some position, such as is shown in FIG. 4, the instantaneous axis of rotation shifts from O to O' but the load still acts through the original axis of rotation O. Thus, a torque results which is the product of the lever arm O—O' and the weight W. This torque comprises a moment which tends to displace the pivot further, and therefore it opposes the other restoring forces of the pivot caused by the cantilever spring characteristics of the leaves 13 and 14. Obviously, as the load W is increased from an initial very small value the above deflecting moment comprising the product of the arm O—O' multiplied by the weight W increases. If the weight W is sufficiently increased, this moment can be made to just equal the spring restoring forces provided by the leaves 13 and 14, whereupon the pivot exhibits a zero restoring force. On the other hand, if the load W is reduced slightly below this balanced point, the restoring forces of the leaves 13 and 14 may be permitted to somewhat exceed the deflection torque (O—O')W, and by proper adjustment of the load W the actual period of a seismometer in which the pivot is installed can be adjusted as desired. The description of the pivot shown in FIGS. 1 through 4 is a description of the known state of the prior art on which the current invention seeks to build.

Figure 6:
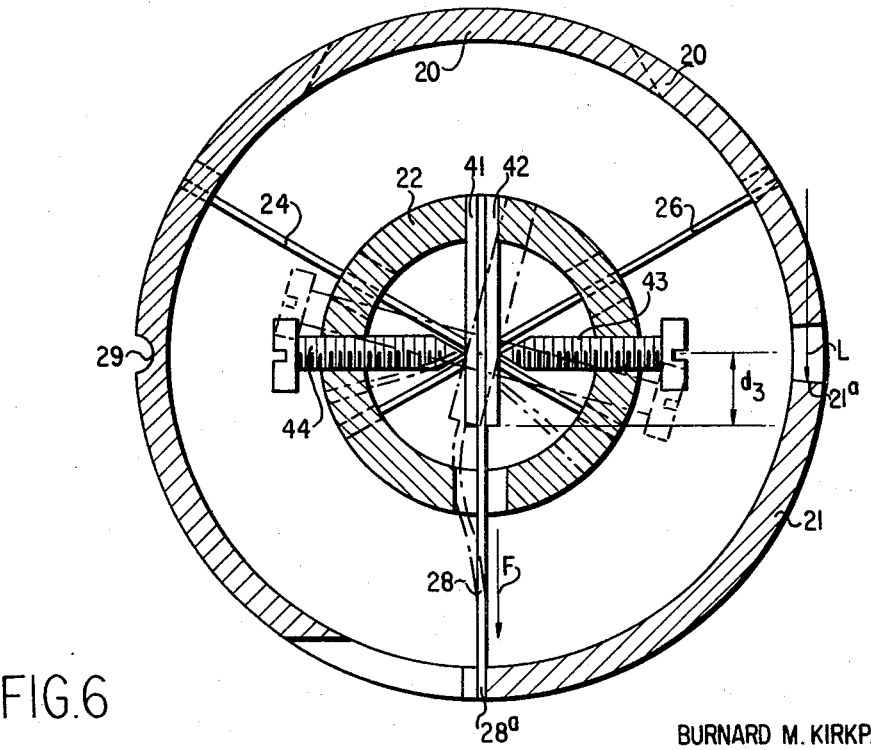
FIG. 6 is a view of a modified triflexure pivot similar to FIG. 5 but showing the third ligament or leaf modified to compensate the system for the tendency of the leaf to change length during deflection.

The triflexure pivot includes three crossed-ligaments supporting a moveable armature 22 within a pivot housing 20. FIG. 5 shows such a triflexure suspension employing a cylindrical housing 20 and a cylindrical armature 22 extending therethrough. This general type of construction can also be seen in FIGS. 8 and 9, FIG. 5 being a cross-sectional view taken axially through the two coaxial cylinders. In this structure, there are ligaments 24, 26 and 28 in three mutually crossing planes. The ligaments 24 and 26 correspond approximately with the leaves 13 and 14 in FIGS. 1 through 4, these ligaments being fixed at their outer ends 24a and 26a in the outer cylindrical housing 20, and being fixed at their inner ends 24b and 26b in the cylindrical armature 22. The armature is cut away as at 23, 25 and 27 to pass the ligaments through the wall of the armature 22. The third ligament is added to the crossed-flexure pivot which would exist if only the ligaments 24 and 26 were used, and this third ligament 28 can be thought of as representing at least part of the load W shown in FIGS. 1 through 4 to the extent that it is under tension. Its loading is added to the weight contributed by the armature 22 and by whatever load the armature supports when built into a practical seismometer system. In FIGS. 5 and 6 the loading provided by the ligament 28 and by the weight on the armature is shown as the force vector F. The portion of the triflexure pivot described so far is broadly known in the prior art, but the present invention provides improvements which are also illustrated in FIGS. 5 and 6. In particular, recalling for the moment that a change in the force F changes the restoring tendency of the pivot, and that it is capable of changing it all the way from a relatively strong positive restoring force through zero restoring force and to a negative restoring force as the loading force F is increased as was described above in connection with FIG. 4, the applicant uses this capability to adjust the restoring force of the triflexure pivot by changing the component of the force F applied thereto by tensioning the ligament 28 in a novel manner. It will be noted in FIGS. 5, 6, 8 and 9 that the housing 20 has been slotted to separate from the main body of the housing 20 a moveable hinged portion thereof labelled 21. The hinged portion is coupled to the housing 20 at a milled slot 29 shown in FIGS. 5, 6, and 9, but the hinged portion 21 is otherwise separated from the housing along its circumferential edges as well as at its free end 21a. Hence, the ligaments 24 and 26 are fixed in the non-moveable portion of the housing 20, whereas the special third ligament 28 is fixed at 28a in the hinged portion 21 of the housing. If an adjusting force L is applied between the non-hinged portion 20 of the housing and the hinged portion 21 thereof as shown in FIGS. 5 and 6, the latter portion can bend in the vicinity of the milled slot 29, whereby to tension the ligament 28 and increase its downward pull, thus increasing the loading force F. In this way, the net force F on the armature, which represents a force similar to the weight W in FIG. 4, for instance, is the sum of the load supported by the armature 22 plus the load which is added by tensioning the third ligament 28 as a result of the adjustably applied force L. The application of such control by tensioning the third ligament of the triflexure pivot is believed to be novel per se, and the specific structural details by which this tensioning is adjustably accomplished according to the present invention are also believed to be novel as compared with the triflexure pivot in its simplest, non-adjustable form. Referring now particularly to the showing in FIG. 5, this figure shows that the intersection of the plane of the third ligament 28 with those of the ligaments 24 and 26 as viewed axially of the cylinders 20 and 22 is at the center of the armature 22 when the pivot is non-deflected. This intersection is a line including the point O, as is also shown in FIGS. 3 and 4. However, when the pivot is deflected so that the ligaments occupy the dashed line positions shown in FIG. 5, a new intersection including the point O' moves to the left of the original point O, thereby forming a moment arm O—O'. This moment O-O' develops a torque of magnitude equal to the product of the arm length times the force F acting through the center of rotation O of the triflexure armature, this torque corresponding with the torque (O—O')W in FIG. 4. This torque, when small, only tends to reduce the restoring force of the ligaments 24 and 26 considered as leaf spring cantilevers. When the torque increases, it can eventually be made to nullify the restoring forces of the leaves 24 and 26, and eventually to overcome them to the point where a negative restoring force is actually created which renders the system unstable. This phenomenon has been previously discussed in connection with FIG. 4.

In order to provide a practical means for varying the force F so as to adjust the sign and magnitude of the net restoring torque of the suspension pivot, the external adjustment force L is applied to the free end 21a of the hinged moveable portion 21 of the housing 20, this force L tensioning the ligament 28 by bending the hinged portion 21 of the housing at the milled slot 29. The magnitude of the external force L is amplified by the fact that it is transmitted to the ligament 28 with an approximate 2:1 mechanical advantage resulting from the attachment of the ligament 28 half-way between the external force L and the pivot 29. When the ligament 28 is downwardly tensioned in this manner, such tension is transferred as additional loading to the ligaments 24 and 26 to thereby reduce the restoring torque of the pivot, and in this manner a method of adjusting the restoring force of the pivot is accomplished which does not involve the necessity of adjusting the weight which is actually supported by the present pivot when installed in a seismometer.

The type of pivot shown in FIGS. 5, 6, 8 and 9 is used, for example, to improve the long-period seismometer system of the LaCoste type which is shown in FIG. 7. This seismometer comprises an arm 30 having a weight or mass 32 at its outer end, and this arm is connected to another arm 33 by means of a pivot 34. The other arm can be anchored at its top pivot 35, and supports a spring 36 which is connected to a pivot 37 located at a point along the arm 30 which is short of the weight 32. This is the basic type of suspension shown, for instance, in FIG. 6 of the LaCoste Pat. No. 2,293,437 to provide an infinite period geometry in the manner discussed in that patent, practical seismometers being also illustrated in other views of that patent. If the angle of the spring 36 with respect to the arm 30 is properly selected and the spring is properly tensioned, the load represented by the weight 32 becomes a levitated mass whose position within a working range of positions about the pivot 34 is in indifferent equilibrium. The applicant's novel pivot, of which a practical embodiment is shown in FIGS. 8 and 9 is used in the present invention to replace a prior-art type of pivot and to become the supporting pivot 34 shown in FIG. 7. Moreover, it is assumed that the suspension is adjusted to provide the necessary spring 36 tension to maintain the mass 32 in indifferent equalibrium with zero restoring force, not considering the torque of the pivot at 34. If the restoring force of the applicant's pivot as shown in FIG. 8 is adjusted to zero, then its substitution for the pivot 34 in the LaCoste seismometer system schematically shown in FIG. 7 will provide no change in that system.

However, an inventive feature of the applicant's disclosure resides in the fact that torque may be added to the arm 30 at the pivot 34 by using a pivot such as is shown in FIG. 8 and by adjusting that pivot to provide a certain amount of restoring torque on the arm 30. If this is done, the free period of the seismometer geometry shown in FIG. 7 will be altered from exhibiting an infinite period involving zero restoring force to providing a restoring moment which is adjustable, positive or negative, to allow the free period of the suspension of FIG. 7 as a whole to be adjusted at will without disturbing the magnitude or position of the mass 32 and/or without changing the tilt of the over-all suspension as has been the case where normal methods of free period adjustment were resorted to to add a certain amount of restoring force to the suspension of FIG. 7.

Naturally, the arm 30 when attached to the armature 22 of the pivot shown in FIGS. 5, 6, 8 and 9 will add weight thereto, and this weight will become part of the force F shown in FIG. 5. Although the force F is shown as acting downwardly in FIGS. 5 and 6, in a practical seismometer the entire triflexure pivot assembly will be rotated until the force contributed by the attachment of arm 30 to the armature 22 will act in line with the ligament 28 as shown in FIG. 5, which would mean clockwise rotation of the pivot shown in FIG. 5 through some angle to bring the two forces into mutual alignment. The housing 20 of the pivot shown in FIGS. 8 and 9 is secured to the lower end of the arm 33 which in the working model of the invention is forked to engage the grooves 20a as shown in FIG. 9. The arm 30 is also forked at its left end to engage and be equally supported by both ends of the armature 22 to which it is attached. In a practical system, the outer housing 20 which attaches to the arm 33 is supported against leftward displacement by a stationary stop member S whose position may be made adjustable.

Returning now to a further consideration of FIGS. 5 and 6, the behavior for small deflections of the unloaded triflexure pivot shown in FIG. 5 is essentially determined by the ligaments themselves when considered as simple cantilever leaves. However, the pivot's behavior under both weight and external force loading L becomes very complex, the more so as the amount of loading is increased. To a first approximation, the pivot's loaded behavior for large deflections is that of a non-linear torsional spring whose spring rate is not constant but increases as the deflection is increased. When the pivot in this form is applied to a seismometer this non-linear behavior decreases the seismometer's free period when the mass is deflected away from its normal centered position, resulting in an undesirable free period vs mass-position characteristic. If the force F can be kept constant the spring rate of the triflexure pivot can be kept more nearly constant. In actual practice, part of the force F is attributable to the external load L which is applied to the hinged portion 21 of the triflexure housing through a compression spring which is labelled 40 in FIG. 8. This manner of application of the force L would seem to make the force less critical in view of the fact that the only expected changes would be attributable to small dimensional changes due to temperature. However, the compression spring 40 has substantial disadvantages. As the triflexure armature 22 of FIG. 5 is rotated from its centered zero position shown in solid lines, the distance between the third ligament's attachment points decreases from the dimension $d1$ to the dimension $d2$. In view of the fact that the length of the ligament cannot change, the hinged portion of the housing 21 to which the outer end of the ligament 28a is attached will retreat downwardly under the influence of the force F. Note that downward motion of the hinged portion 21 of the housing in FIGS. 5 and 6 corresponds with leftward motion of the hinged portion 21 of the housing as shown in FIG. 8. The spring 40 will thereby be permitted to lengthen, but the magnitude of the external force L which it provides will be correspondingly reduced because of the fact that the force of a compression spring decreases as it is allowed to extend its length. This fact is troublesome because if the seismometer period is to remain constant within permissible mass deflections, the loading of the triflexure pivot must remain constant despite rotational changes in the position of the armature 22 within such limits. Accordingly, some method must be found to compensate the change of the dimension $d1$ to the dimension $d2$ as the armature is displaced from its center position.

FIG. 6 shows a way of compensating the third ligament structure so that as deflection of the armature 22 occurs the moveable portion 21 of the housing will remain motionless and the externally applied force L will remain constant. The desired compensation is accomplished by using a stiff ligament bridge 41, and 42 to stiffen the upper portion of the ligament 28 which attaches to the armature 22. The ligaments 24 and 26 in FIG. 6 are the same as those shown in FIG. 5 but the ligament 28 has been augmented by two rigid bridge members 41 and 42 disposed on opposite sides of the end of the ligament 28 and attached to the armature 22. These bridge members 41 and 42 are further supported by screw clamping members 43 and 44 which assure that the bridge members 41 and 42 will always remain exactly centered with respect to the axis of the armature cylinder 22. These bridge members 41 and 42 therefore make the armature end of the third ligament rigid so that any flexing of the ligament which occurs must occur below the bridge members as shown in FIG. 6. The bridge members 41 and 42 extend below the axis of rotation of the triflexure armature 22 by a distance $d3$ which is selected to compensate for the change in dimension from $d1$ to $d2$ so that the effective length of the exposed portion of the ligament 28 which extends to the housing 21 remains constant for permissible pivot deflections. The manner of this compensation can be intuitively understood by noting that in the absence of the bridge members 41 and 42, the hinged portion 21 of the housing as seen in FIG. 5 tends to retreat downwardly when the pivot is deflected. Conversely, if the bridge members 41 and 42 were made so long that they extended nearly to the hinged portion 21, deflection of the armature 22 would tend to raise the hinged portion 21. Between these two extremes, there is a length for the bridge members 41 and 42 where precise compensation occurs.

The effect of this compensation arrangement of the two bridge members 41 and 42 and the ligament 28 is to prevent movement of the hinged portion 21 of the housing regardless of rotation of the armature 22 within the design limits of the system. in this way, the external loading of the triflexure pivot contributed by the compression spring 40 remains constant for all allowed positions of rotation of the armature 22, and the compensated triflexure pivot will exhibit a constant spring rate over its allowed range of rotation. In actual practice, such triflexure pivots when installed in properly adjusted long period seismometers, for instance, of the type shown in FIG. 7 at the pivot 34, have provided essentially constant free periods in excess of 30 seconds, regardless of the mass position at the free end 32 of the arm 30 providing it was within design limits.

The restoring torque of the triflexure pivot, as shown for instance in FIGS. 5, 6 and 8 is readily adjusted by changing the external force L applied to the hinged portion 21 of the pivot structure. This force is determined by the pressure of the spring 40 against the free end 21a of the hinged portion 21 as shown in FIG. 8, and adjustment of this spring pressure has the effect of adjusting the free period of a LaCoste type seismometer system in which the present pivot structure is installed, in the illustrative example at the pivot 34 in FIG. 7. The easiest way of changing the pressure of the spring 40 against the free end 21a is probably by means of a simple screw adjustment, but this means has the disadvantage that the effect upon the free period of the seismometer by adjustment of such a simple mechanism is not obvious to the person making such adjustment, except perhaps to the extent that when the screw is turned in one direction it increases the free period, and when turned in the other direction it decreases the free period. It was stated that one object of the present invention is to provide an improved means for applying the force L by way of the compression spring in such a way that adjustment of the spring force adjusting member will provide a change in free period which is easily predictable.

The free period of a torsional pendulum is related to the restoring torque by a well established equation as follows:

$$T_o = 2\pi \sqrt{K/U}$$

where $T_o$ represent the free period in seconds, K represents the moment of inertia in appropriate units and U represents the restoring torque in units which are similar to the units in which K is expressed. A LaCoste suspension in simple configuration, as is employed for present purposes and shown in FIG. 7, can be thought of as merely comprising a convenient mass support means which when adjusted for infinite free period will support the moveable mass 32 weightlessly in space, the only restoring force for the seismometer suspension being provided by the pivot shown in FIG. 8 when employed at the pivot 34 in FIG. 7. In this combination of components the mass position and the dynamics of the resulting oscillatory system are controlled by the adjustable triflexure pivot of FIG. 8 in such a way as to provide a system which can be treated as a torsional pendulum and can be expected to obey the relationship described in the equation as set forth above. Moreover, in view of the fact that the mass of the particular system and its physical dimensions represent constants, the above equation can be simplified to read $$T_o^2 \alpha \; 1/U$$

This is a square-law relationship such that if it is desired to change the free period by a factor of 2, the restoring torque introduced by the triflexure pivot must be changed by a factor of 4, for example. This non-linear relationship makes the effect of a given triflexure adjustment even more difficult for an operator to predict. As a result, in prior art systems not using an adjustable pivot at 34 of the type taught in the present invention, adjustments have usually been made by trial and error changing of the various system parameters. The present invention provides an improved means for effecting the adjustment while at the same time compensating out the square-law relationship between spring rate change and free period which is inherent in all oscillatory systems obeying the laws of a second order system.

The present invention accomplishes satisfactory linearization of restoring torque vs. free-period characteristics in a long period seismometer by combining the several variables which exist, for instance including the characteristics of the triflexure pivot and those of the compression spring 40 controlling the force L applied to the pivot including the square-law relationship between the restoring torque and the free-period, into the design of a single compensating ramp 56 which then operates in a cam-like manner to adjust the compression of the spring 40 with change of rotational position of the ramp 56 when the gear 54 is rotated. FIG. 8 shows a frame 50 attached to the housing 20 and supporting a sliding shaft 52 carrying a rotatable gear 54 and the cam-like ramp 56 which serves to control the compression of the spring 40. This mechanism includes a foot member 46 pressing against the free end 21a of the hinged portion 21 of the housing 20. The spring 40 is compressed between the foot 46 and the enlarged hollow end 47 of the slidable shaft 52 which carries a cam follower wheel 48 as can be seen in FIGS. 8 and 12. The cam follower 48 moves the shaft 52 axially back and forth in the frame 50 in order to change the compression of the spring 40 and thereby press the foot 46 against the free end 21a with a pressure which is adjusted in accordance with the rotational position of the ramp 56. FIG. 10 shows the flat profile of a ramp having a cam surface 49 which is then rolled into circular configuration, as shown in FIGS. 8 and 11.

FIG. 12 is a schematic showing of the means for controlling the free length of the compression spring 40 as it moves from the position shown in solid lines to the position shown in dotted lines. The length of the ramp is divided into equal increments as shown at 57 which increments can be selected to represent graduated free periods for the particular over-all seismometer system in which the ramp is installed. As the ramp is moved beneath the cam follower 48 and the spring 40, the latter is adjusted in length, and by careful calibration of the ramp equal adjustments can be made to change the free period of the over-all seismometer assembly in equal steps. When the force L of the spring is applied to the triflexure pivot shown in FIG. 6 the pivot will exhibit the desired restoring torque in order to obtain the particular free period sought for the seismometer.

As a practical manner, the free period ramp is driven by reduction gearing 58–54, an idler gear 58 being driven by the shaft (not shown) of a motor 59 by which the free period can be remotely adjusted. The use of this particular adjustment mechanism allows equal increments of motor run time to provide equal changes in the restoring torque of the triflexure pivot, or else in the over-all period of the seismometer system in which it is installed, whichever is desired. The motor 59 is preferably a digital stepping motor driven by suitable remote equipment to provide equal steps as it rotates the cam surface 49 of the ramp 56. Having linearized the relationship between motor rotation and free period, the adjustment of the seismic system in which the present pivot is installed becomes sufficiently predictable that a computer (not shown) can be connected to control the motors 59 of one or more such seismometers, perhaps arranged in an array, so that the free period of each of the seismometers can be automatically adjusted to equal a particular preassigned value, reproducible within very close tolerances.

The present invention is not to be limited to the exact embodiments discussed in connection with the drawings, for obviously changes in the structure can be made within the scope of the following claims:

I claim:

1. An adjustable period seismometer comprising in combination:
   a. seismometer means including frame means and a suspension comprising a system of arms and spring means mutually interconnected by pivots and supporting a pendulous mass, the suspension being geometrically oriented and adjusted to have zero restoring force for displacements of the mass within a range of permissible positions; and
   b. one of the pivots included in the system supporting said pendulous mass comprising a pivot structure having a centered position disposed to fall within said range of positions, said pivot structure including crossed-flexure suspension means operative upon displacement of the pendulous mass to impart to the pivot a torsional restoring force for yieldably urging the mass toward said centered position, and said pivot structure including means for adjusting the flexure suspension means of the pivot to vary its restoring force and thereby control the period of the seismometer.

2. In a seismometer as set forth in claim 1, said one pivot supporting a component of said pendulous mass as part of its load, and said means for adjusting the flexure suspension including means within the pivot structure and independent of said pendulous mass and operative to add an adjustable increment of load to the crossed-flexure pivot to change its restoring force.

3. In a seismometer as set forth in claim 1, said one pivot comprising a triflexure pivot including a housing surrounding an armature, the pendulous mass being connected to said armature and applying a loading force thereto; first and second crossed flexure ligament means connected between said housing and said armature and disposed symetrically about the direction of said loading force; third ligament means connected between said housing and said armature and disposed in the direction of said loading force and across said first and second ligament means; and auxiliary pivot loading means carried by the housing and operative to adjustably change the tension of the third ligament means to apply an adjustable increment of load to the first and second ligament means to adjust the restoring force of the pivot.

4. In a seismometer as set forth in claim 3, the housing of said one pivot having a moveable portion to which said third ligament means is connected; spring means operative to deflect said moveable portion with respect to the housing in a direction to tension said third ligament means; and means for adjusting the deflecting force of said spring means.

5. In a seismometer as set forth in claim 4, said means for adjusting the deflecting force of said spring means comprising cam means supported on said housing and supporting one end of the spring means whose other end is supported by said moveable portion; and motor means carried by said housing and coupled to adjust the position of the cam means to vary the force of said spring means.

6. In a seismometer as set forth in claim 5, said cam means being proportioned to make equal displacements of its position produce a uniform rate of change in the free period of the seismometer; and said motor means comprising an incremental stepping motor.

7. A suspension pivot for supporting a load and having an adjustable restoring force characteristic tending to return the loaded pivot to a centered position, comprising:
   a. a supporting body and an armature to which said load is coupled;
   b. crossed-flexure ligament means coupled between the body and the armature and symetrically disposed with respect to the force direction of said load;
   c. and auxiliary pivot loading means independent of said load and coupled between the body and said armature and oriented to apply an increment of load to the crossed-flexure means acting in the same direction as the force of said supported load to adjust the total loading of said pivot and determine the magnitude of its restoring force.

8. In a suspension as set forth in claim 7, said crossed-flexure means comprising first and second ligament means, and said auxiliary pivot loading means comprising third ligament means connected between the armature and the supporting body and disposed in the direction of said loading force and across said first and second ligament means; and means carried by the housing and operative to adjustably change the tension of the third ligament means to apply an adjustable increment of load to the first and second ligament means.

9. In a suspension as set forth in claim 8, said supporting body having a moveable portion to which said third ligament means is connected; and said means to change the tension of the third ligament means comprising spring means operative to deflect said moveable portion with respect to the body in a direction to tension said third ligament means; and means for adjusting the deflecting force of said spring means.

10. In a suspension as set forth in claim 9, said means for adjusting the deflecting force of said spring means comprising; cam means supported on said body and supporting one end of the spring means whose other end is supported by said moveable portion; and motor means carried by said body and coupled to adjust the position of the cam means to vary the force of said spring means.

11. In a suspension as set forth in claim 10, said cam means being proportioned to make equal displacements of its position produce a rate of change in the restoring force of the pivot as weighted by said load such that a uniform rate of change in the free period of the seismometer is produced; and said motor means comprising an incremental stepping motor.

12. In a suspension as set forth in claim 8, said supporting body including an annular housing surrounding said armature, and the housing having a moveable portion comprising a segment of the housing separated therefrom at its circumferential edges and at one axially disposed free end and hinged to the housing along an opposite axially disposed end, the third ligament means being connected to said moveable housing portion; spring means operative to deflect said moveable portion with respect to the body in a direction to tension said third ligament means; and means for adjusting the deflecting force of said spring means.

13. In a suspension as set forth in claim 12, said means for adjusting the deflecting force of said spring means comprising cam means rotatably supported on said body; follower means supporting one end of the spring and the other end of the spring being supported by said moveable portion and yieldably urging it to move about said hinged end to tension said third ligament means, said follower means being positioned by the rotational position of the cam means; and motor means carried by said body and coupled to adjust the position of said cam means.

14. In a suspension as set forth in claim 12, said third ligament means being flexible along a part of its length extending from said moveable housing portion toward its connection with the armature, and being inflexible for the remainder of its length to the armature, and the two parts of the third ligament means being so proportioned with respect to the length of the third ligament means that the moveable portion of the housing is not moved by deflection of the armature from its rotationally centered position.

* * * * *